(12) United States Patent
Hodgson et al.

(10) Patent No.: US 10,427,609 B2
(45) Date of Patent: Oct. 1, 2019

(54) VEHICLE INTERIOR COMPONENT

(71) Applicant: Shanghai Yanfeng Jinqiao Automotive Trim Systems Co. Ltd, Novi, MI (US)

(72) Inventors: Thomas Scott Hodgson, Holland, MI (US); Rick Alan Anderson, Grand Haven, MI (US); Bryan Todd Jones, Holland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 18 days.

(21) Appl. No.: 15/837,468

(22) Filed: Dec. 11, 2017

(65) Prior Publication Data
US 2018/0170267 A1 Jun. 21, 2018

Related U.S. Application Data

(60) Provisional application No. 62/436,823, filed on Dec. 20, 2016.

(51) Int. Cl.
*B60R 7/04* (2006.01)
*F16H 19/04* (2006.01)

(52) U.S. Cl.
CPC ............... *B60R 7/04* (2013.01); *F16H 19/04* (2013.01)

(58) Field of Classification Search
CPC ........... B60R 7/04; F16H 19/04; A47B 51/00; A47B 2051/005; A47B 77/10; F25D 25/025
See application file for complete search history.

(56) References Cited

U.S. PATENT DOCUMENTS

| | | | | |
|---|---|---|---|---|
| 4,684,164 A | * | 8/1987 | Durham | B60R 11/02 180/167 |
| 5,020,845 A | * | 6/1991 | Falcoff | B60R 7/04 224/311 |
| 5,184,489 A | * | 2/1993 | Squires | B60R 11/0205 296/37.12 |
| 5,311,790 A | * | 5/1994 | Yanagisawa | B23Q 1/58 108/137 |
| 5,524,859 A | * | 6/1996 | Squires | B60R 11/0205 248/27.1 |
| 6,494,150 B1 | * | 12/2002 | Phoenix | A47B 51/00 108/147 |

(Continued)

FOREIGN PATENT DOCUMENTS

WO 2016/011285 A1 1/2016

*Primary Examiner* — Hanh V Tran

(57) ABSTRACT

A vehicle interior component is disclosed. The component may comprise a mechanism to guide movement of a bin relative to a base in a direction to open from a retracted position to an extended position for bin access. The mechanism may guide generally linear movement of the bin along a direction generally parallel to or aligned with the direction to open. The mechanism may comprise a set of gears and a set of gear racks. The set of gears may be coupled to one of the base and the bin. The set of gear racks may be formed as one piece with the other of the base and the bin. The set of gears may comprise helical gears coupled to an axle. The set of gear racks may be configured to engage a set of helical gears. The set of gears may provide resistance to movement of the bin.

19 Claims, 14 Drawing Sheets

(56) References Cited

U.S. PATENT DOCUMENTS

| | | | | |
|---|---|---|---|---|
| 7,175,291 B1* | 2/2007 | Li | B60R 1/12 |
| | | | 359/838 |
| 7,184,266 B1* | 2/2007 | Chen | B60R 11/0235 |
| | | | 312/196 |
| 8,282,177 B1* | 10/2012 | Rotter | F25D 25/025 |
| | | | 312/402 |
| 8,424,983 B1* | 4/2013 | Strauss | A47B 51/00 |
| | | | 312/247 |
| 8,820,003 B2* | 9/2014 | DeLorean | A47B 81/00 |
| | | | 312/242 |
| 9,513,048 B2* | 12/2016 | Choo | F25D 25/02 |
| 9,989,761 B2* | 6/2018 | Yomogita | F16M 11/046 |
| 2006/0066188 A1* | 3/2006 | Crawford | A47B 51/00 |
| | | | 312/247 |
| 2006/0076860 A1* | 4/2006 | Hoss | A47B 51/00 |
| | | | 312/312 |
| 2008/0252090 A1* | 10/2008 | Tiesler | B60R 1/008 |
| | | | 296/37.7 |
| 2008/0289264 A1* | 11/2008 | Bowman | A47B 51/00 |
| | | | 52/29 |
| 2009/0146444 A1 | 6/2009 | Ichimaru | |
| 2010/0176704 A1* | 7/2010 | Kim | F25D 25/024 |
| | | | 312/408 |
| 2013/0081421 A1* | 4/2013 | Kwon | F25D 23/04 |
| | | | 62/440 |
| 2013/0270989 A1* | 10/2013 | Park | F25D 23/00 |
| | | | 312/404 |
| 2016/0282960 A1* | 9/2016 | Abe | B60N 3/102 |
| 2017/0023177 A1* | 1/2017 | Yomogita | F16M 11/046 |
| 2017/0135480 A1* | 5/2017 | Chen | F16H 19/04 |

\* cited by examiner

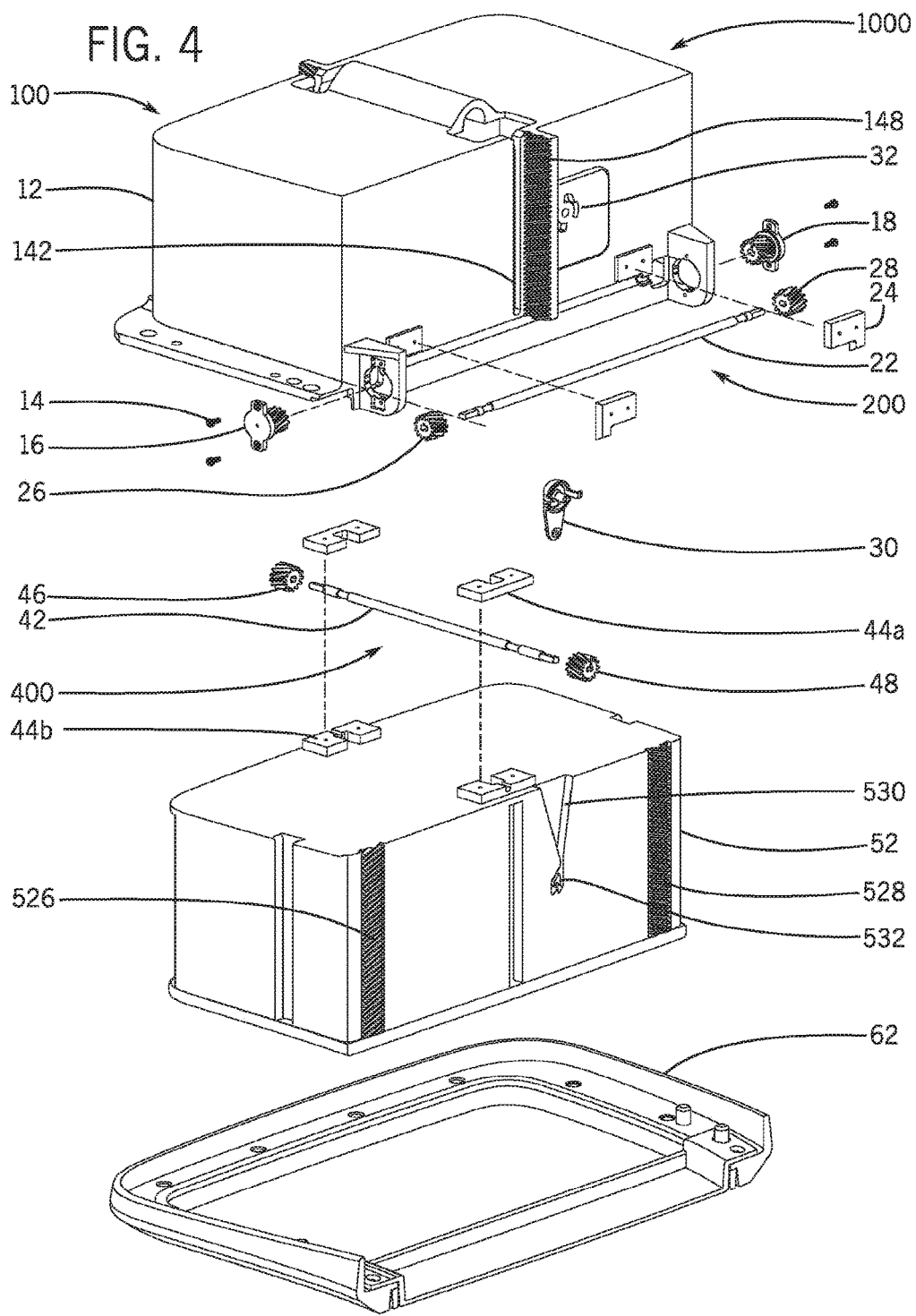

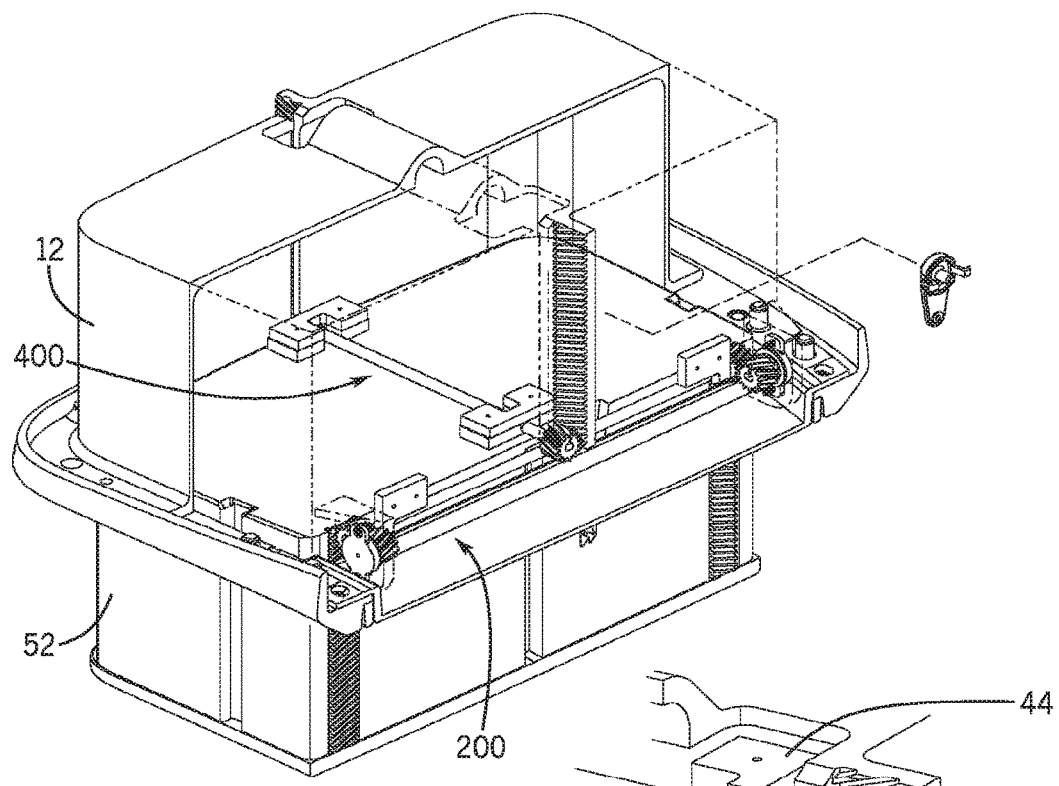
FIG. 8C
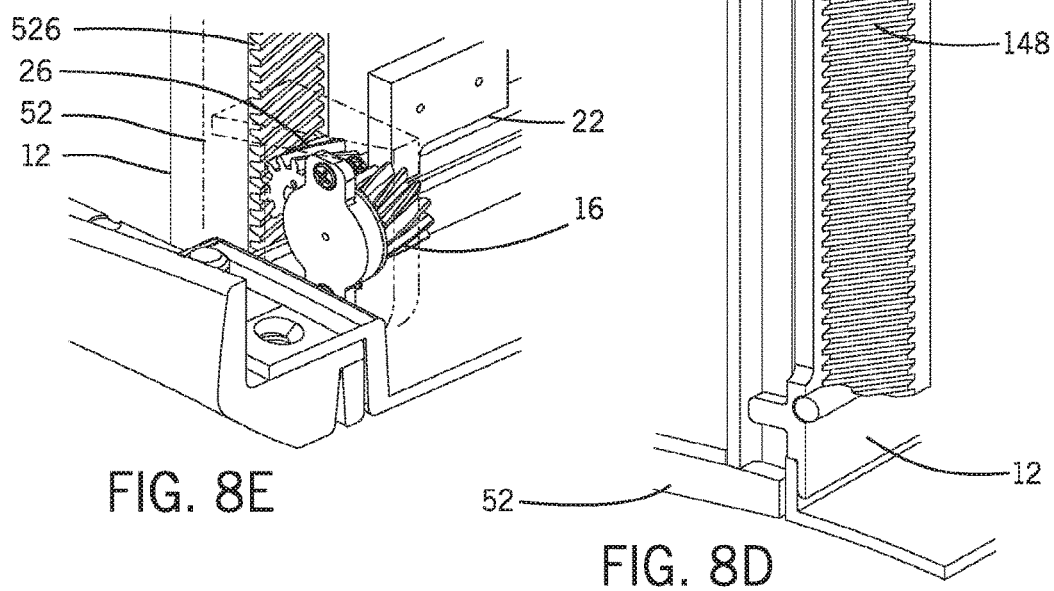
FIG. 8E
FIG. 8D

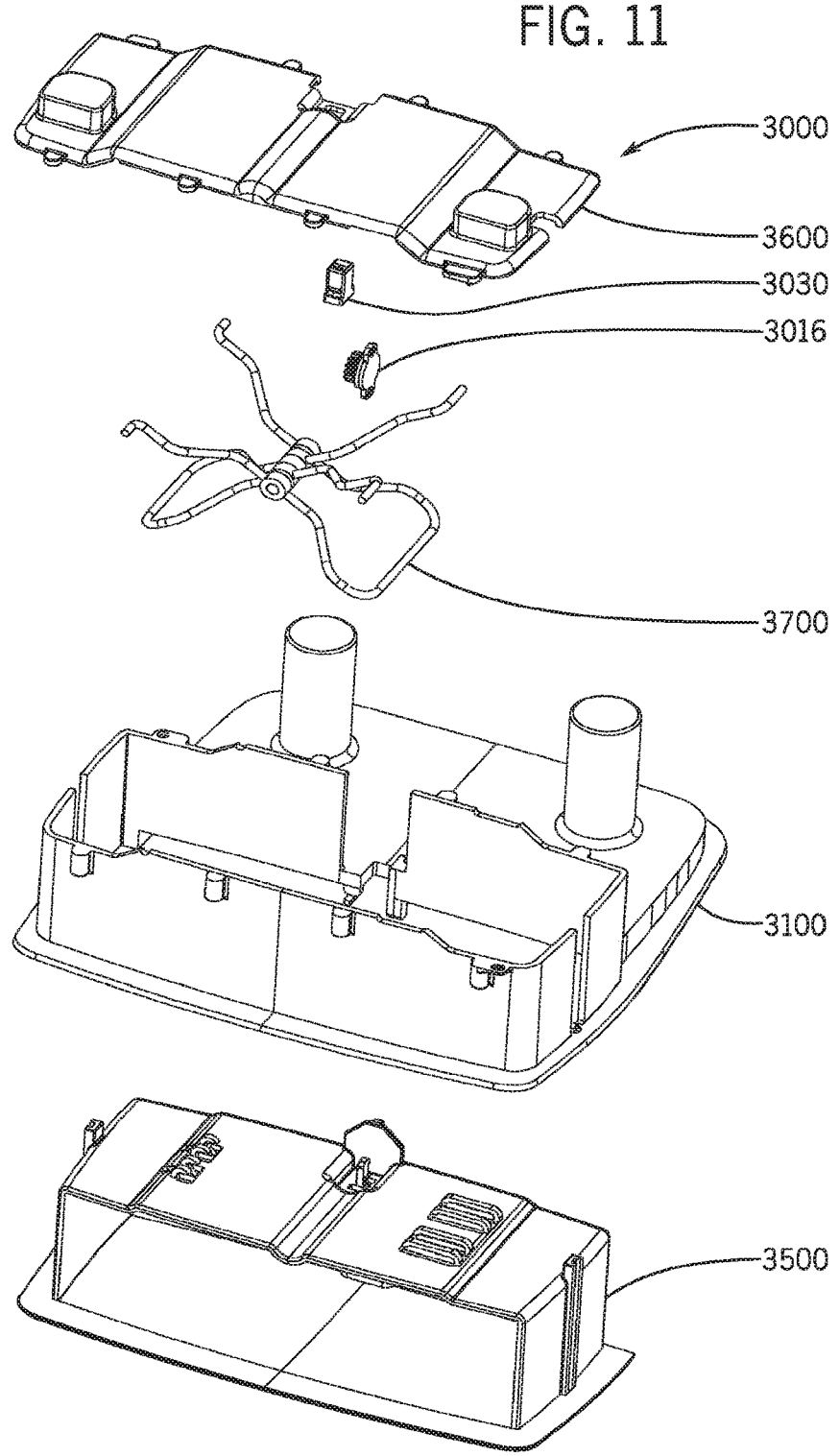

VEHICLE INTERIOR COMPONENT

FIELD

The present invention relates to a vehicle interior component. The present invention also relates to a retractable storage bin assembly for a vehicle console for stowing articles. The present invention also relates to a bin assembly having a gear assembly to guide linear movement of a retractable bin relative to a base. The present invention further relates to an overhead storage bin assembly having a latch configured for securing the bin in a retracted position within the base.

CROSS REFERENCE TO RELATED APPLICATIONS

The present application claims priority from and the benefit of U.S. Provisional Patent Application No. 62/436,823 filed Dec. 20, 2016 entitled "Vehicle Interior Component". The entirety of this application is hereby incorporated herein by reference in its entirety.

BACKGROUND

It is well-known that vehicle storage compartments may be positioned throughout an interior of a vehicle to store cargo, personal articles and other items. A center console may include a storage compartment suitable for storing sunglasses, driving glasses, etc. Other storage compartments may be located within an overhead console, an armrest, seats, door panels, a dashboard, or other areas of the vehicle interior. Certain storage compartments may rotate between open and closed positions to facilitate placement and storage of an object in the storage compartment. Storage compartments may include a bin that is limited in size partly because of a lip that blocks the object from tumbling out when the storage compartment is rotated to the open or closed position. The rotating motion of the storage compartment may introduce spacing constraints between the compartment and a surrounding housing, reducing the aesthetic appearance of the vehicle interior.

It would be advantageous to provide a linear-motion storage bin assembly for use within a vehicle interior. It would be further advantageous to provide a storage bin assembly that requires minimal overhead clearance space, securely retains stored contents upon opening and closing of the bin, and maximizes interior storage space better than rotatable storage assemblies. It would be further advantageous to provide a storage bin assembly that adjusts smoothly and quietly with minimal vibration and minimal looseness.

SUMMARY

The present invention relates to a component for a vehicle interior configured to stow an article. The component may comprise a base, a bin and a mechanism. The bin may be coupled to the base. The bin may comprise a receptacle into which the article can be stowed. The bin may be configured to move relative to the base in a direction to open from a retracted position to an extended position for access to the bin. The mechanism may be configured to guide movement of the bin relative to the base. The mechanism may be configured to guide movement of the bin relative to the base along a direction generally parallel to the direction to open. The mechanism may comprise a set of gears coupled to an axle and a set of gears coupled to the base. The set of gears coupled to the axle may comprises helical gears. The set of gears coupled to the base may comprise helical gears. The mechanism may comprise a set of gear racks. The bin and the set of gear racks may be formed as one piece. The set of gear racks may be configured to engage a set of helical gears. The set of gears coupled to the base may comprise a set of dampers configured to engage the set of gears coupled to the axle and the set of gear racks. The set of gears coupled to the base may configured to provide resistance to movement of the set of gears coupled to the axle to guide movement of the bin relative to the base. Movement in the direction to open may be generally or substantially linear. The component may comprise a latch. The latch may be configured to retain the bin when the bin is in the retracted position.

The present invention also relates to a component for a vehicle interior configured to stow an article. The component may comprise a base, a bin and a mechanism. The bin may be coupled to the base. The bin may comprise a receptacle into which the article can be stowed. The bin may be configured to move relative to the base in a direction to open from a retracted position to an extended position for access to the bin. The mechanism may be configured to guide movement of the bin relative to the base. The mechanism may be configured to guide movement of the bin relative to the base along the opening direction. The mechanism may comprise a set of gears and a set of gear racks. The set of gears may be coupled to an axle. The axle may be coupled to the bin. The base may comprise a slot. At least a portion of the axle may extend through the slot of the base. The set of gears may comprise a set of helical gears. The set of gear racks may comprise a set of helical gear racks. The base and the set of gear racks may be formed as one piece. The mechanism may comprise at least one tab configured to move within a slot. The bin may comprise at least one tab configured to align the bin with the base. The base may comprise a latch. The bin may comprise a slot. The latch may be configured to engage the slot of the bin.

The present invention further relates to a component for a vehicle interior configured to stow an article. The component may comprise a base, a bin and a mechanism. The bin may be coupled to the base. The bin may comprise a receptacle into which the article can be stowed. The bin may be configured to move relative to the base in a direction to open from a retracted position to an extended position for access to the bin. The mechanism may be configured to guide movement of the bin relative to the base. The mechanism may comprise a set of gears and a set of gear racks. The set of gears may be coupled to one of the base and the bin. The set of gear racks may be coupled to the other of the base and the bin.

FIGURES

FIG. 4 is a schematic exploded view of a storage bin assembly according to an exemplary embodiment.

FIGS. 8A to 8C are schematic partial cut-away perspective views of a storage bin assembly according to an exemplary embodiment.

FIG. 8D is a schematic partial perspective view of a storage bin assembly according to an exemplary embodiment.

FIG. 8E is a schematic partial perspective view of a storage bin assembly according to an exemplary embodiment.

FIG. 11 is a schematic exploded view of a storage bin assembly according to an exemplary embodiment.

DESCRIPTION

Figure 1A:
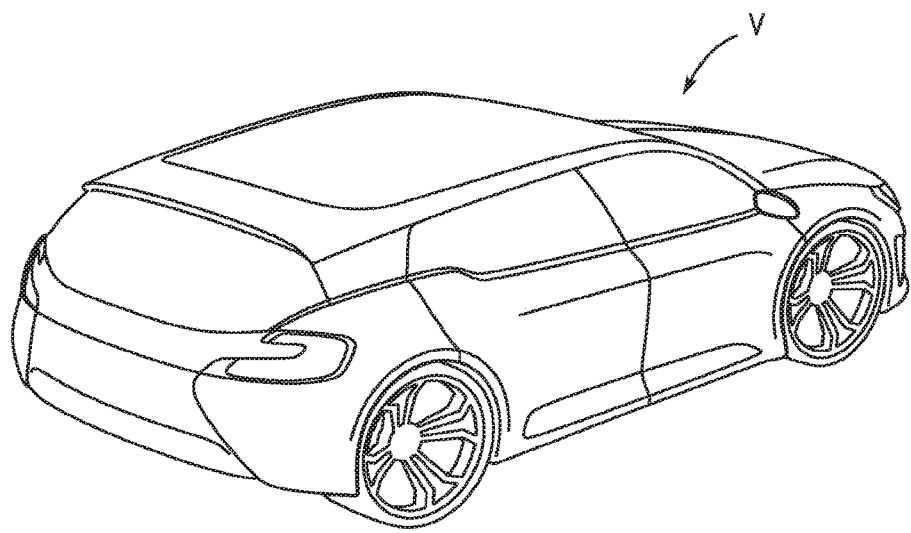
FIG. 1A is a schematic perspective view of a vehicle according to an exemplary embodiment.
Figure 1B:
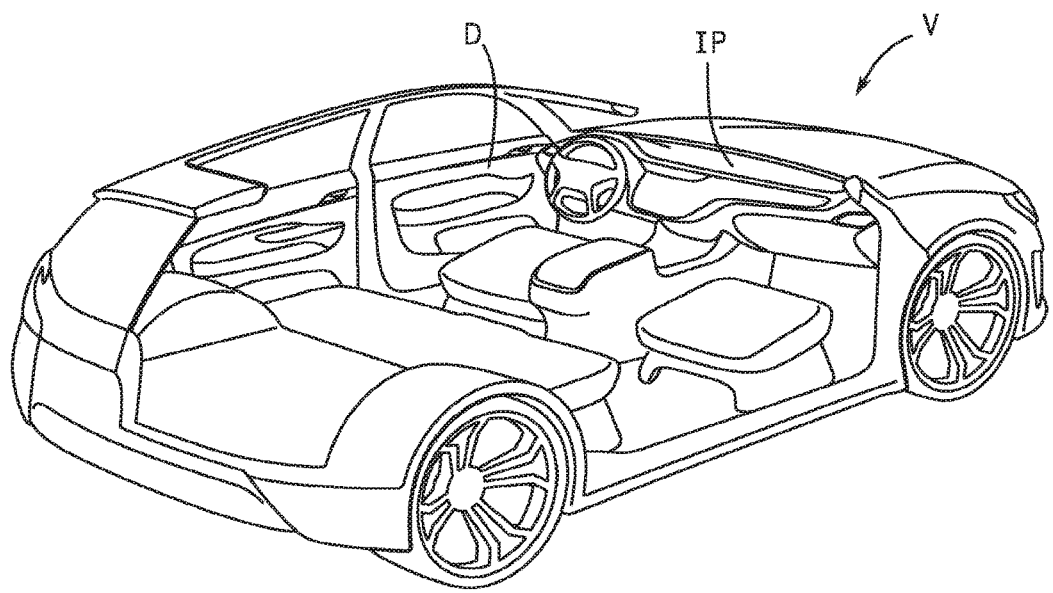
FIG. 1B is a schematic perspective cut-away view of the vehicle of FIG. 1A showing a vehicle interior according to an exemplary embodiment.
Figure 2A:
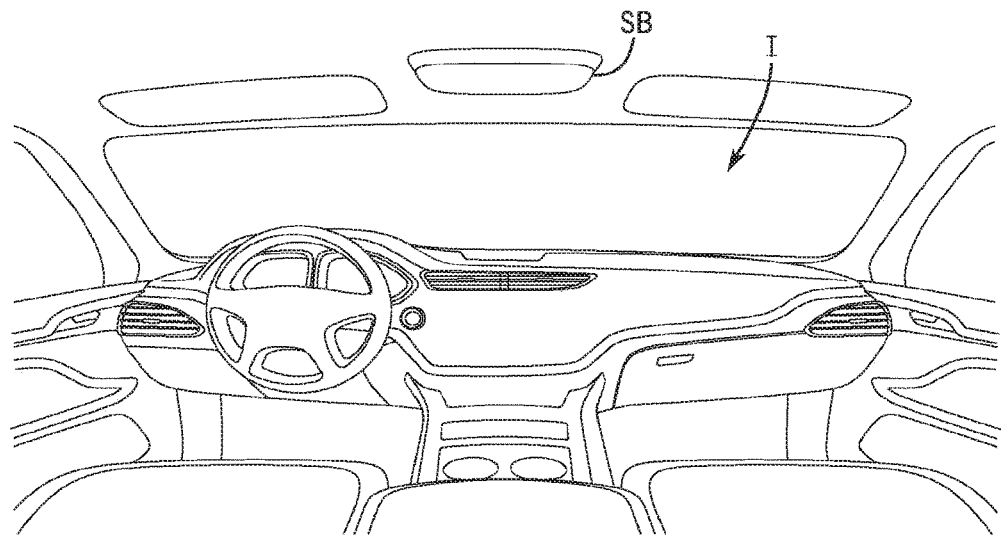
FIG. 2A is a schematic elevation view of a vehicle interior according to an exemplary embodiment.
Figure 2B:
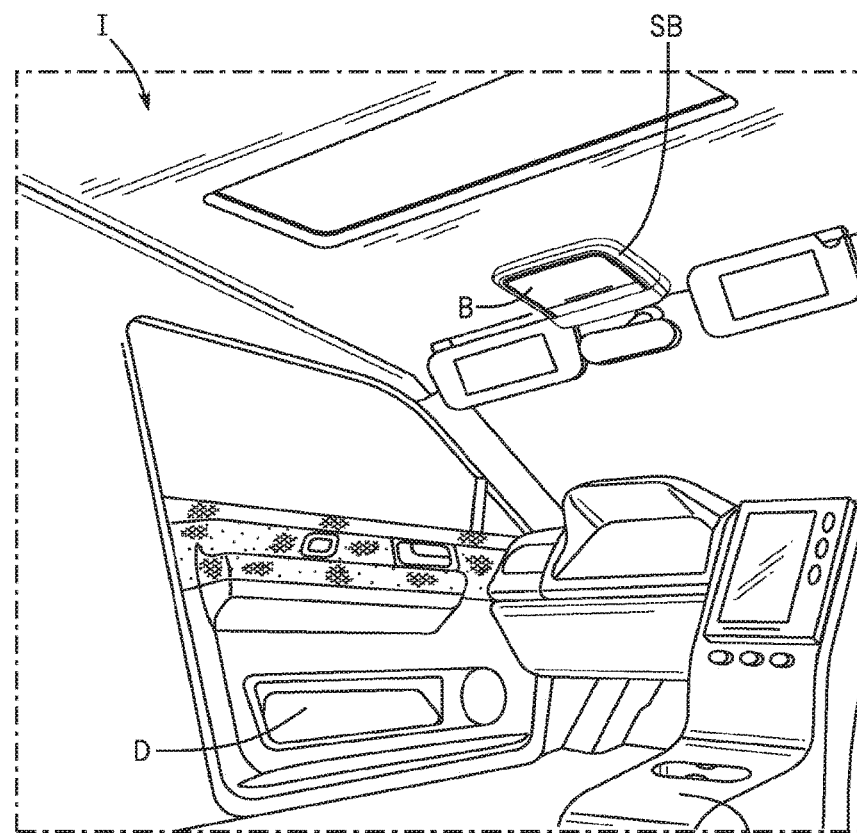
FIG. 2B is a schematic perspective view of a vehicle interior according to an exemplary embodiment.

According to an exemplary embodiment as shown schematically in FIGS. 1A and 1B, a vehicle V may comprise an interior I with an instrument panel IP and door D. As shown schematically in FIGS. 2A and 2B, interior I of vehicle V may comprise a floor console FC and an overhead storage bin SB having a retractable bin B. According to an exemplary embodiment as shown schematically in FIGS. 2A and 2B, floor console FC may be located between the front passenger seats and storage bin SB may be located in the interior I of vehicle V. As shown schematically in FIGS. 2A and 2B, storage bin SB may be generally centered between front row seats of vehicle V.

Figure 3A:
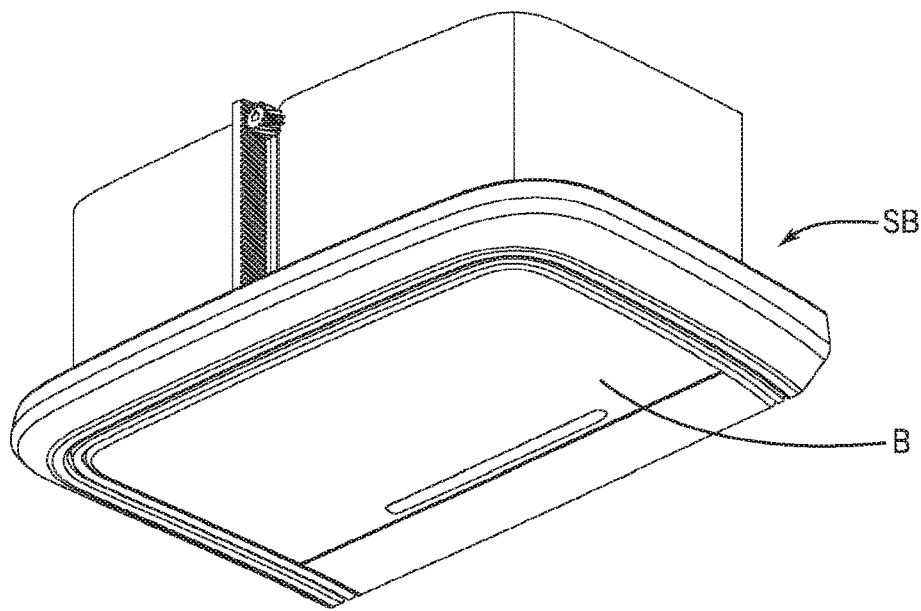
FIGS. 3A to 3C are schematic perspective views of a storage bin assembly according to an exemplary embodiment.
Figure 3B:
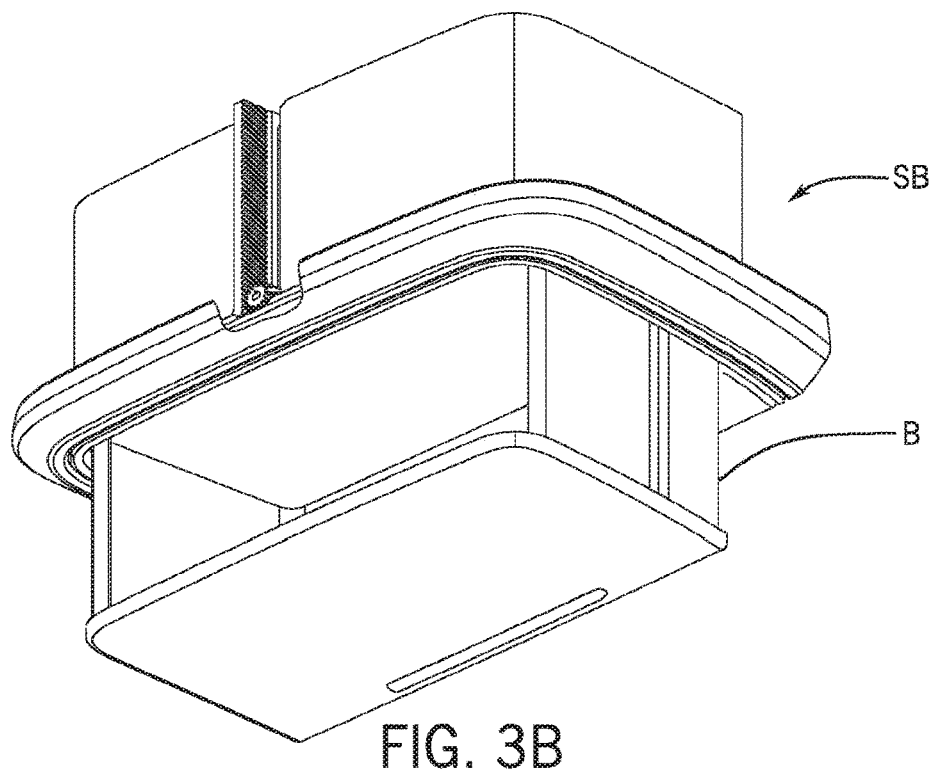

According to an exemplary embodiment as shown schematically in FIGS. 3A and 3B, a storage bin SB may comprise a bin B. Bin B may move in a direction to open from a retracted position as shown schematically in FIG. 3A to an extended position for access to an interior storage compartment of the bin B as shown schematically in FIG. 3B.

Figure 3C:
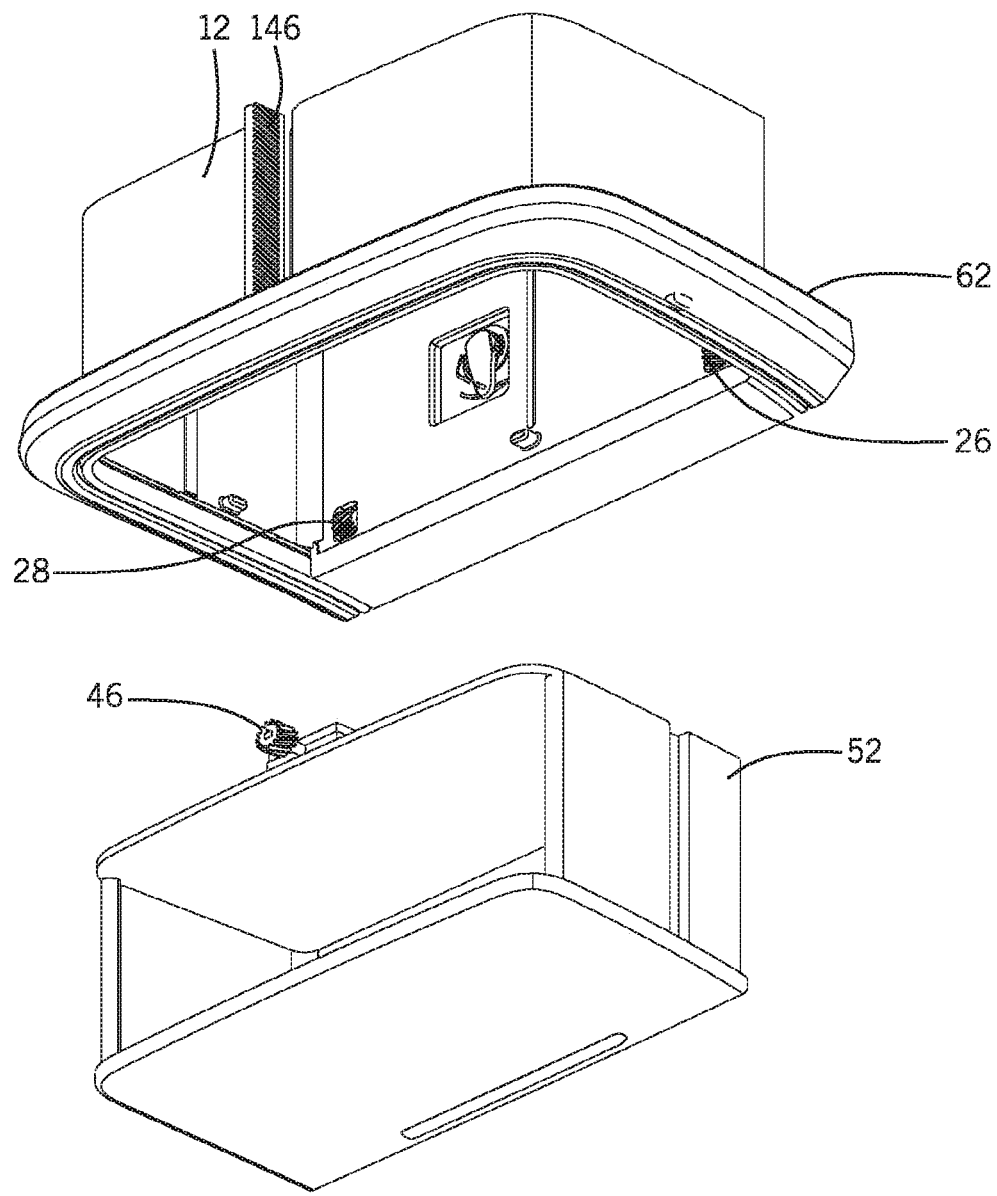

According to an exemplary embodiment as shown schematically in FIGS. 3C and 4, a storage bin assembly 1000 may comprise a housing or base 12, a bin 52 and a bezel 62. Base 12 may comprise opposing pairs of side panels defining an interior cavity, an open bottom for receiving bin 52 and a top panel opposite the open bottom. Base 12 may comprise opposing linear gear racks 146 and 148 extending generally vertically along at least a portion of opposing side panels between the open bottom and top panel. Gear racks 146 and 148 may extend outwardly from side panels of base 12 and extend generally perpendicular to the side panel from which the gear racks 146 and 148 extend. Gear racks 146 and 148 may comprise a plurality of helical threads or teeth for engagement with corresponding teeth of gears 46 and 48 that may be rotationally secured to bin 52. Base 12 may comprise cross-car gears 26 and 28 extending through openings in a side panel of base 12 and into the interior cavity.

According to an exemplary embodiment as shown schematically in FIGS. 3C and 4, bin 52 may comprise a bottom panel and opposing top panel joined together by a plurality of side panels. The bottom panel, top panel and side panels of bin 52 may define a storage compartment. According to an exemplary embodiment, the storage compartment may be sized to receive personal articles such as sunglasses, mobile electronic devices, jewelry, remote control garage openers, etc.

According to an exemplary embodiment as shown schematically in FIGS. 3C and 4, one side of bin 52 may be open or include an opening for access to the storage compartment. As shown schematically in FIGS. 3A-3B, bin B (bin 52) may move generally linearly (e.g. generally vertically) relative to base 12 (base 100) between a retracted or closed position shown schematically in FIG. 3A and an extended or open position as shown schematically in FIG. 3B.

According to an exemplary embodiment as shown schematically in FIG. 4, storage bin assembly 1000 may comprise a housing assembly 100, a latch 30 a cross-car gear assembly 200, a bin 52, a fore/aft gear assembly 400 and a bezel 62. Housing assembly 100 may comprise base 12 having a top panel, side panels extending downward from edges of the top panel and an open bottom (see FIG. 3C) opposite the top panel. Housing assembly 100 may comprise a mounting flange around at least a portion of the open bottom for securing base 12 to bezel 62. Storage bin assembly 1000 may be secured within a vehicle interior (such as to the interior ceiling of a vehicle V as shown schematically in FIGS. 2A and 2B) by bezel 62 and fasteners.

According to an exemplary embodiment, housing assembly 100 may comprise an axle slot 142 extending generally vertically along a side panel adjacent gear rack 148 and curved slots 32 in a side panel for receiving mounting tabs of latch 30 (with latch 30 secured along an interior side of the side panel of base 12). Slots 32 may enable latch 30 to rotate when bin 52 moves relative to base 12. Base 12 may comprise two axle slots 142 on opposing side panels.

According to an exemplary embodiment as shown schematically in FIG. 4, bin 52 may comprise a plurality of side panels and a top panel. Right and left gear racks 526 and 528 may extend generally vertically along at least a portion of opposing side panels and generally perpendicular to the top panel. Bin 52 may comprise a latch slot 530 formed within a side panel for engagement with latch 30. Latch slot 530 may comprise an inwardly recessed channel having a tapered waist portion (see FIG. 5C) between a flared upper end and lower end. Bin 52 may comprise a protrusion 532 which may be inwardly spaced from the sides and bottom edge of recessed latch slot 530. The flared upper end of latch slot 530 may widen as it extends upward from the tapered waist portion toward the top panel of bin 52. The bottom edge of latch slot 530 may comprise an upward extending ridge positioned between recessed troughs on opposing sides of the ridge (see also FIGS. 5E-5H). Protrusion 532 may be surrounded by the recessed channel and may comprise an angled bottom edge with a downward-extending catch. The angled bottom edge of protrusion 532 may be above the upward extending ridge on the bottom edge of latch slot 530. Latch 30 may be positioned on an interior side of a side panel of base 12 and comprise a dowel (see FIGS. 5E-5H)

that may extend into the interior cavity of base 12 and may be configured for engaging the recessed channel of latch slot 530.

According to an exemplary embodiment as shown schematically in FIG. 4, housing assembly 1000 may comprise cross-car gear assembly 200. Cross-car gear assembly 200 may comprise a cross-car axle 22, right and left cross-car gears 26 and 28 and right and left damper gears 16 and 18. As shown schematically in FIG. 4, cross-car gear assembly 200 may be located at a bottom portion of a side panel of base 12 opposite the top panel with cross-car axle 22 extending along a portion of the length of the side panel. Right and left damper gears 16 and 18 may be supported by opposing flanges outwardly extending from base 12 and may each comprise a rotatable gear portion and a mounting plate securable to the flange. Right and left damper gears 16 and 18 may extend through openings in the opposing flanges with the mounting plates secured to the flanges by fasteners 14 so that the rotatable gear portions of the damper gears 16 and 18 may be situated between the flanges. Damper gears 16 and 18 may be configured to guide movement of bin 52 when storage bin assembly 1000 is opened and closed by providing resistance to gear racks 526 and 528 to achieve the effect of a damper.

According to an exemplary embodiment as shown schematically in FIG. 4, cross-car clamp plates 24 may be affixed to a side panel of base 12 to secure cross-car axle 22 to base 12. Right and left cross-car gears 26 and 28 may be secured to opposing ends of cross-car axle 22 and configured to rotate around cross-car axle 22. Right and left cross-car gears 26 and 28 may extend through openings in the side panel of base 12 to engage right and left gear racks 526 and 528 on bin 52. Right and left cross-car gears 26 and 28 may engage right and left damper gears 16 and 18 such that rotation of right and left cross-car gears 26 and 28 along gear racks 526 and 528 may rotate right and left damper gears 16 and 18.

According to an exemplary embodiment as shown schematically in FIG. 4, fore/aft gear assembly 400 may comprise forward and rear gears 48 and 46 secured to opposing ends of a fore/aft axle 42 for rotation around the fore/aft axle 42. Fore/aft axle 42 may be secured to the top side of the top panel of bin 52 by fore/aft clamp plates 44a secured to reciprocal clamp plates 44b on the top exterior side of bin 52. Fore/aft axle 42 may comprise a length that is longer than the width of bin 52 such that forward and rear gears 48 and 46 at the opposing ends of the fore/aft axle 42 may extend laterally over the side panels of bin 52 (see FIGS. 5D, 7A and 7B). The ends of the fore/aft axle 42 may extend outwardly through axle slots 42 with forward and rear gears 48 and 46 configured to engage gear racks 146 and 148 on the exterior sides of base 12. Gears 16, 18, 26, 28, 46 and 48 of storage bin assembly 1000 may be helical and reciprocal gear racks 146, 148, 526, 528 may comprise teeth set at an angle to facilitate smooth movement of the gears.

According to an exemplary embodiment as shown schematically in FIG. 4, bezel 62 may be secured to a flange around at least a portion of the open end of base 12. Bezel 62 may comprise a size and shape corresponding to the size and shape of base 12. Bezel 62 may be secured to base 12. The size and shape of base 12 (and corresponding bezel 62) may be modified without departing from the scope of the present invention.

According to an exemplary embodiment as shown schematically in FIGS. 5A-5D, bin 52 may be moved between a retracted position at which the bin assembly is closed and an extended position within the housing at which the bin assembly is open. As shown schematically in FIG. 5A, bin 52 is in a retracted and/or secured position within the base; forward gear 48 on the top portion of the bin may be engaged with gear rack 148 and may be in a position near a top portion of gear rack 148; corresponding rear gear 46 may have the same orientation and position relative gear rack 146 that is shown with forward gear 48 and gear rack 148. As shown schematically in FIG. 5A, right and left cross-car gears 26 and 28 on the housing may be engaged on right and left gear racks 526 and 528 in positions near the bottom of the rear racks 526 and 528. As shown schematically in FIG. 5A, when bin 52 is in the retracted and secured position within the base, the inwardly extending dowel of latch 30 may be seated and restrained in the lower portion of latch slot by the catch of protrusion 532. See also FIG. 5E.

Figure 5A:
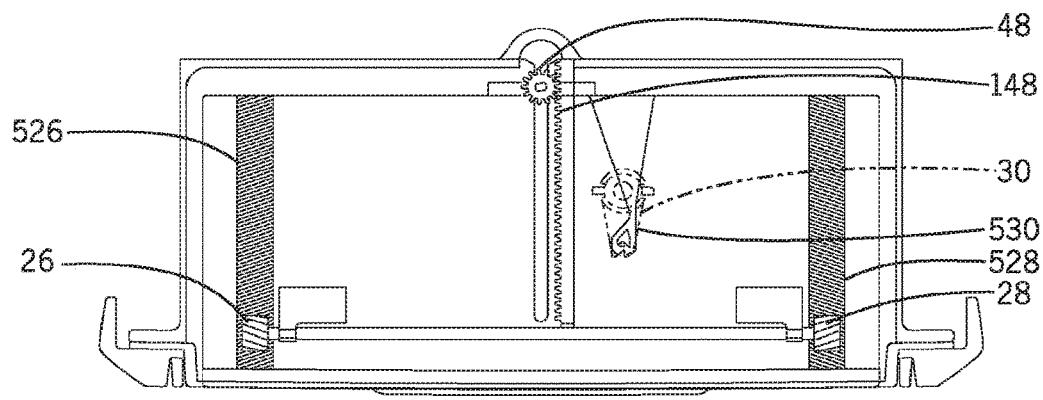
FIGS. 5A to 5D are schematic section views of a storage bin assembly according to an exemplary embodiment.
Figure 5B:
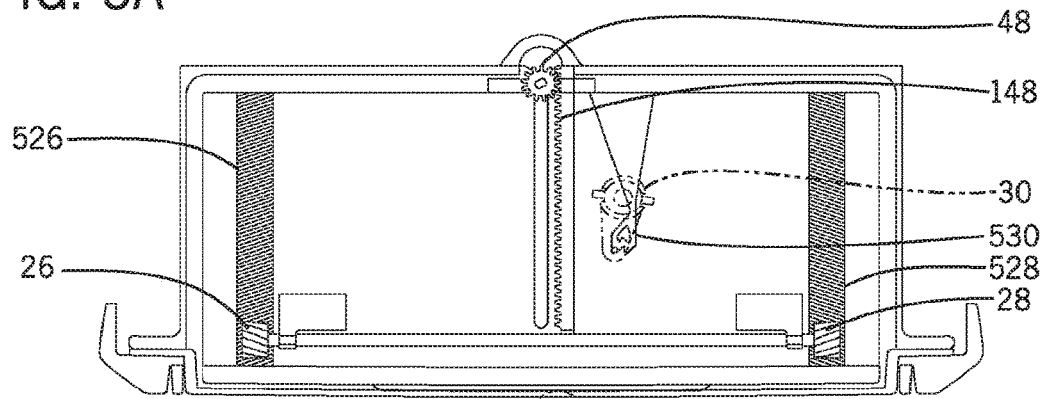

According to an exemplary embodiment as shown schematically in FIG. 5B, opening of the bin may be actuated by exerting an external force on the bottom panel of the bin. A vehicle occupant may use a finger F to push the bottom panel of the bin upward. External force on bin 52 may translate bin 52 within the cavity of the base. Forward gear 48 may move along gear rack 148 from the position shown schematically in FIG. 5A and right and left cross-car gears may move along gear racks 526 and 528 from their positions as shown schematically in FIG. 5A. According to an exemplary embodiment shown schematically in FIG. 5B, upward actuation of the bin may move the latch slot 530 upward relative the stationary latch 30 such that the dowel of latch 30 becomes disengaged from the catch position shown schematically in FIG. 5A to engage a trough portion on the bottom edge of latch slot 530 adjacent the upward extending ridge. As shown schematically in FIG. 5B, latch 30 may be permitted to rotate within curved slotted channels (see FIG. 4).

Figure 5C:
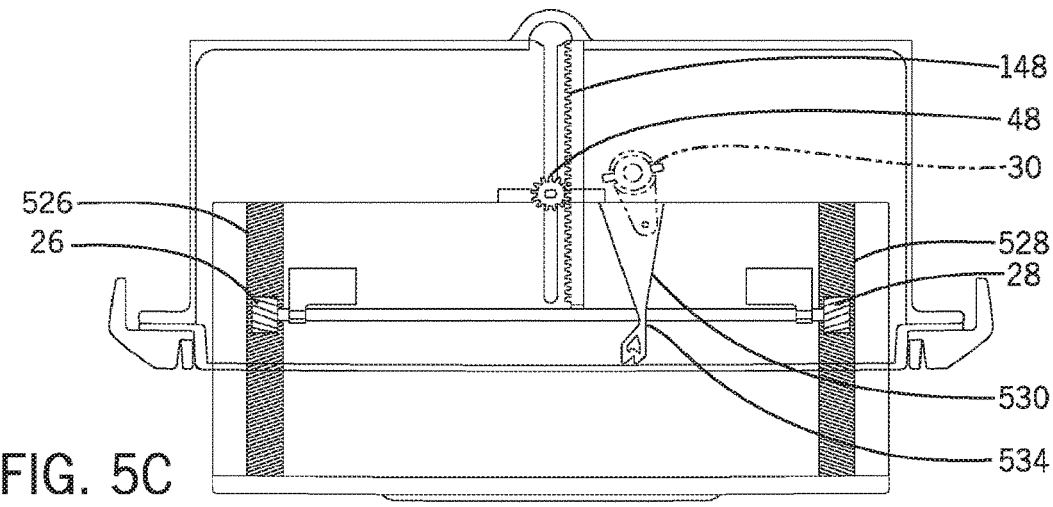

According to an exemplary embodiment as shown schematically in FIG. 5C, the bin may be adjusted to an intermediate position relative the housing between the retracted and extended positions. Following manipulation of the bin into the position shown schematically in FIG. 5B, the position shown schematically in FIG. 5C may be achieved by withdrawing upward force on the bin as shown schematically by finger F in FIG. 5B. As such force is withdrawn, the bin may begin to drop under the force of gravity with the dowel on latch 30 guided around the recessed channel of latch slot 530, through waist area 534 and into the flared upper end of latch slot 530. As shown schematically in FIG. 5C, as bin descends downward forward gear 48 may rotate downward on gear rack 148. Right and left gear racks 526 and 528 on bin may move downward relative right and left cross-car gears 26 and 28 with right and left cross-car gears 26 and 28 rotating and running along right and left gear racks 526 and 528 towards the top panel of bin.

Figure 5D:
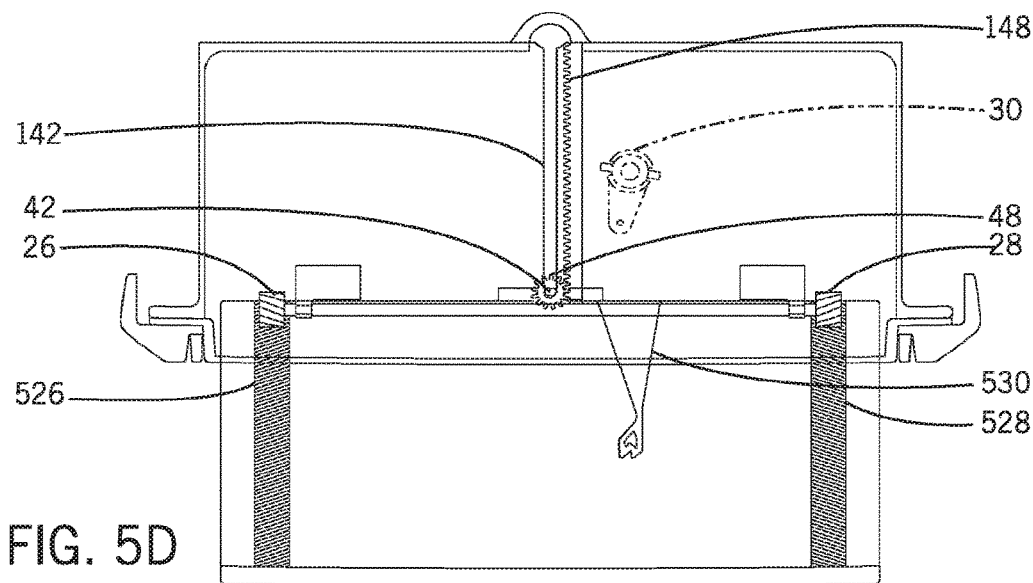

According to an exemplary embodiment as shown schematically in FIG. 5D, the bin may be moved to a fully open/extended position. As shown schematically in FIG. 5D, the fore/aft gear axle 42 may extend through the bottom of axle slot 142 with forward gear 48 engaged to the bottom of gear rack 148. Right and left cross-car gears 26 and 28 may be positioned at the top of right and left gear racks 526 and 528 near the top panel of the bin. According to an exemplary embodiment shown schematically in FIG. 5D, the bin is positioned below latch 30 with latch 30 located above and fully disengaged from latch slot 530.

Figure 5E:
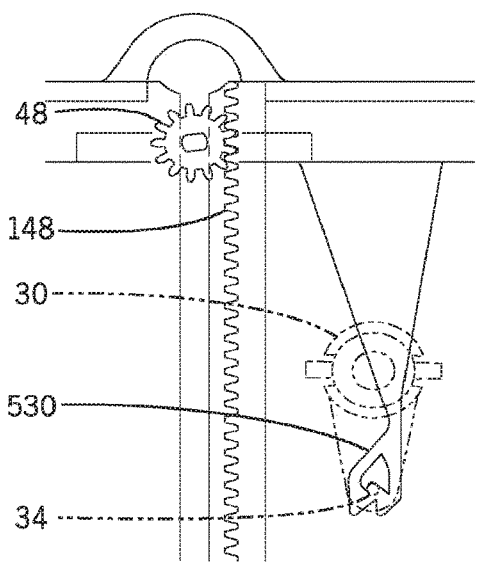
FIGS. 5E to 5H are schematic partial section views of a storage bin assembly according to an exemplary embodiment.

According to an exemplary embodiment, FIG. 5E is a detail view which corresponds to the position of the bin as shown schematically in FIG. 5A. As shown schematically in the exemplary embodiment of FIGS. 5E-5H, latch 30 may comprise a head portion and an arm extending from the head portion. A dowel 34 may extend from a distal end of the arm opposite the head portion. The head portion of latch 30 may comprise tabs for slidably engaging within slots of the base (see FIG. 4) so that latch 30 may rotate or pivot to facilitate guiding dowel 34 within the recessed channel of latch slot 530; latch 30 may be secured to the interior side of a side panel of the housing and that dowel 34 may extend inwardly to engage latch slot 530 on the exterior side of a side panel of the bin.

According to an exemplary embodiment as shown schematically in FIG. 5E, with the bin in a fully retracted and secured position within the base, the teeth of forward gear 48 may be engaged to the corresponding splines of gear rack 148 and forward gear 48 may be positioned at or near the top of gear rack 148. As shown schematically in FIG. 5E, latch 30 is in a vertical position with dowel 34 of latch 30 seated within and restrained by the downwardly-depending catch on the bottom edge of the protrusion of latch slot 530. Engagement of dowel 34 by the catch of latch slot 530 may secure and restrain the bin in place within the base and prevent the bin from opening or sliding downward.

Figure 5F:
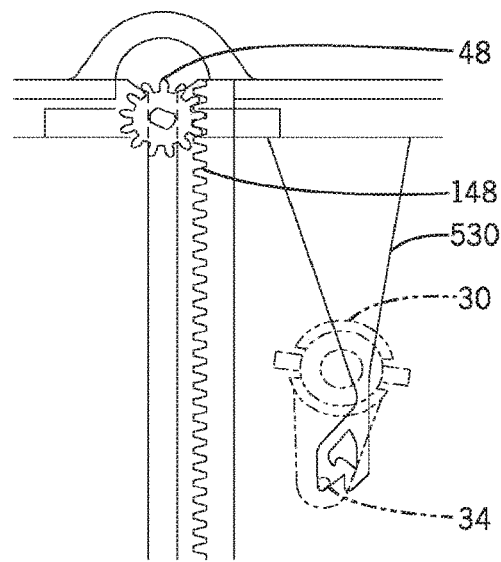

According to an exemplary embodiment, FIG. 5F is a detail view corresponding to the position of the bin shown schematically in FIG. 5B with the bin pushed upward from the retracted and secured position according to an exemplary embodiment. When force is exerted on the bin according to an exemplary embodiment of FIG. 5B, the bin may translate slightly upward within the cavity of the base. As shown schematically in FIG. 5F, upward force on the bin may rotate forward gear 48 upward on gear rack 148 from the position shown schematically in FIGS. 5A and 5E; latch slot 530 on the exterior side of the bin may move upward relative latch 30 that is secured to the stationary housing. As shown schematically in FIG. 5F, upward movement of latch slot 530 may disengage dowel 34 of latch 30 from the catch on the protrusion of the latch slot 530 and the bottom edge of latch slot 530 will move upward to engage dowel 34 at the location shown schematically in FIG. 5F. Engagement may restrict upward movement of the bin. When dowel 34 is disengaged from the catch of latch slot 530 by upward force of the bin, the raised ridge on the bottom edge of latch slot 530 may guide dowel 34 into the location shown schematically in FIG. 5F. As shown schematically in FIG. 5F, latch 30 may be permitted to rotate from the position shown schematically in FIG. 5E which may facilitate the guiding of dowel 34 into the location shown schematically in FIG. 5F.

Figure 5G:
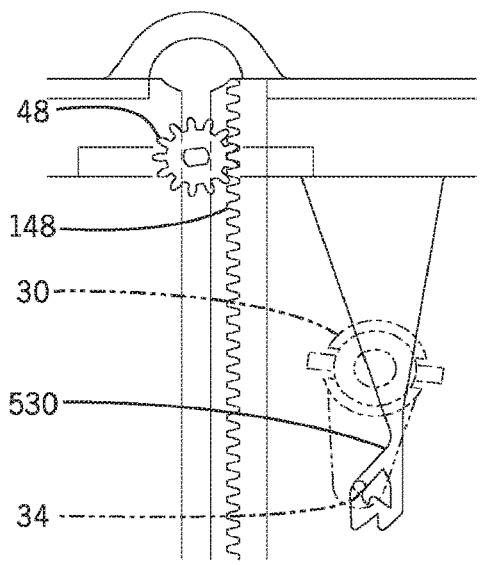

According to an exemplary embodiment, FIG. 5G is an additional detail view showing the position of latch 30, latch slot 530, forward gear 48 and gear track 148 in a position which may result after upward force is withdrawn from the bin as shown schematically in FIGS. 5B and 5F and the bin begins to drop under the force of gravity. According to an exemplary embodiment shown schematically in FIG. 5G, the bin has descended from the position shown schematically in FIG. 5F with gear 48 descending on gear rack 148; latch slot 530 on the side of bin 530 moves downward with the recessed channel of latch slot 530 guided around dowel 34. As shown schematically in FIG. 5G, downward movement of the bin and latch slot 530 may result in dowel 34 being guided around the protrusion of latch slot 530 towards the tapered waist.

Figure 5H:
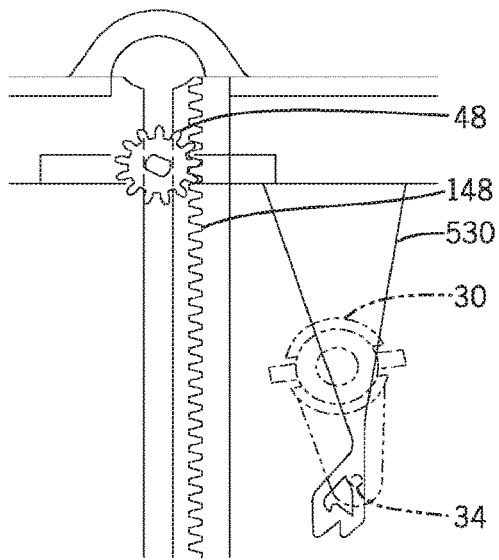
Figure 5I:
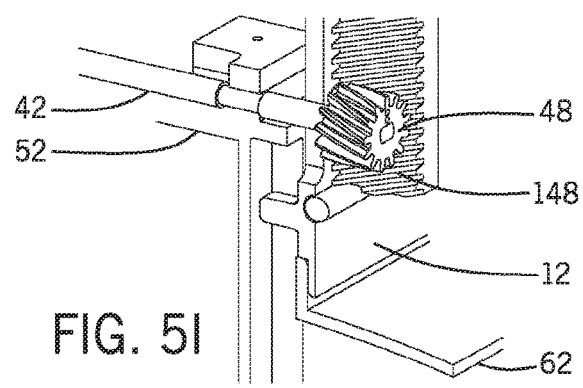
FIG. 5I is a schematic cutaway perspective detail view of a storage bin assembly according to an exemplary embodiment.

According to an exemplary embodiment, FIG. 5H is an additional detail view which shows latch 30, latch slot 530, forward gear 48 and gear track 148 in a position which may result when the bin is moving from the open extended position to the retracted secured position such as when a person closes the bin. As shown schematically in FIG. 5H, with the bin pushed upward the recessed channel of latch slot 530 may move around dowel 34 with dowel 34 passing around the protrusion as shown.

According to an exemplary embodiment, continued upward movement of the bin and the latch slot 530 from the position shown schematically in FIG. 5H may result in the bottom edge of latch slot 530 engaging dowel 34 with latch slot 530 moving around dowel 34 until dowel 34 is positioned against the upward extending ridge on the bottom edge of latch slot 530. Once such engagement is obtained, upward movement of the bin may be restricted; once upward force on the bin is withdrawn, latch slot 530 may settle downward until dowel 34 contacts the protrusion of latch slot 530. When dowel 34 contacts the protrusion contact may guide the bottom edge of the protrusion angularly downward over dowel 34 until dowel 34 becomes seated and secured in the catch as shown schematically in FIG. 5E.

According to an exemplary embodiment, FIGURE SI is a detail view of the bin assembly with a portion of base 12, bin 52 and bezel 62 cutaway to show the position of the fore/aft axle 42 and forward gear 48. As shown schematically in FIGURE SI, fore/aft axle may extend along the top panel of bin 52 and though axle slot (see also FIGS. 4 and 5D) of base 12 so that forward gear 48 may engage gear rack 148. The position of forward gear 48 at the bottom of gear rack 148 as shown schematically in FIGURE SI is representative of the bin 52 positioned in the extended position as shown schematically in FIG. 5D (see also FIG. 6B).

Figure 6A:
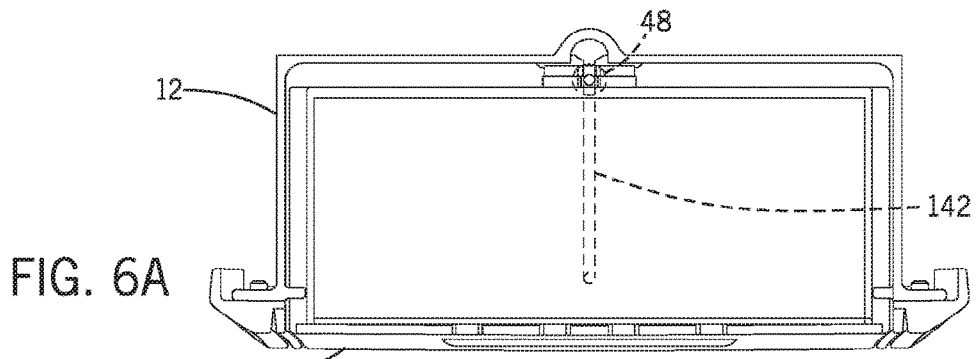
FIGS. 6A to 6B are schematic section views of a storage bin assembly according to an exemplary embodiment.
Figure 6B:
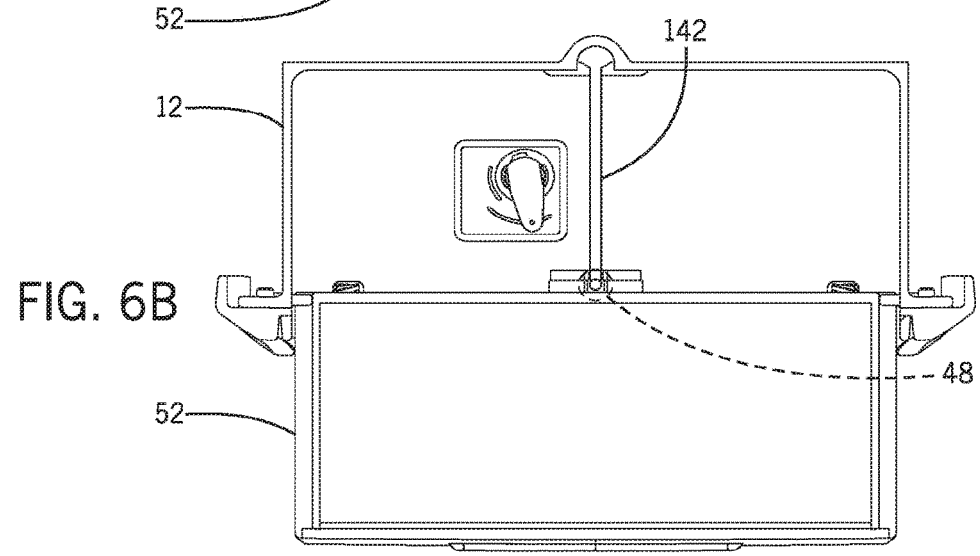

According to an exemplary embodiment as shown schematically in FIG. 6A, the bin assembly may be moved to the closed position with bin 52 fully retracted and secured within base 12. According to an exemplary embodiment of FIGS. 6A and 6B, bin 52 and base 12 may have a telescoping relationship for enabling linear movement of the bin 52 within base 12. As shown schematically in the exemplary embodiment of FIGS. 6A and 6B, the side panels of base 12 and bin 52 may be generally parallel to one another when the bin assembly is in both open and closed. As shown schematically in FIG. 6A, when the bin assembly is closed forward gear 48 is proximate the top of axle slot 142 extending vertically down the side panel of base 12 from the closed top panel. As shown schematically in FIG. 6B, the bin assembly is in the open position with bin 52 shown fully extending from base 12. According to an exemplary embodiment as shown schematically in FIG. 6B, when the bin assembly is open forward gear 48 is near the bottom of axle slot 142.

Figure 7A:
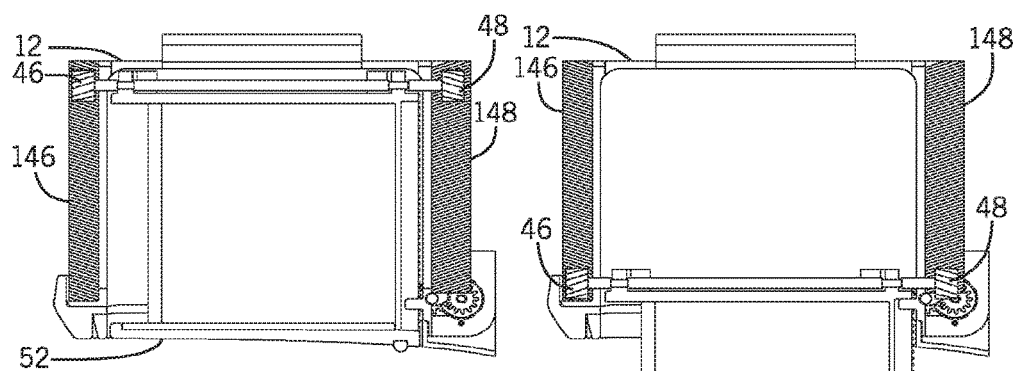
FIGS. 7A to 7B are schematic section views of a storage bin assembly according to an exemplary embodiment.
Figure 7B:

According to an exemplary embodiment as shown schematically in FIG. 7A, the bin assembly may be moved to the closed position with bin 52 fully retracted and secured within base 12. According to an exemplary embodiment as shown schematically in FIG. 6A, when the bin assembly is closed forward and rear gears 48 and 46 may be near the top of their corresponding gear racks 146 and 148 which extend vertically down opposing side panels of base 12 from the closed top panel. As shown schematically in FIG. 7B, the bin assembly is in the open position with bin 52 fully extended from base 12. As shown schematically in FIG. 7B, forward and rear gears 48 and 46 may be near the bottom of their corresponding gear racks 146 and 148. As shown schematically in FIGS. 7A and 7B, gear racks 146 and 148 extend generally perpendicularly from exterior sides of opposing side panels of base 12.

Figure 8A:
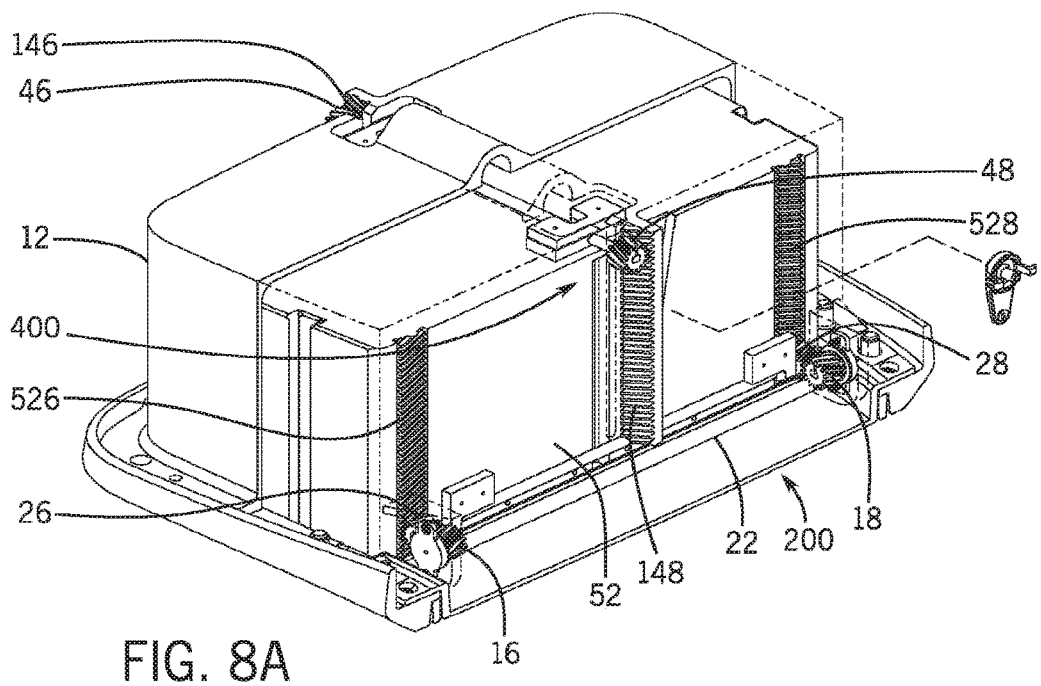

According to an exemplary embodiment as shown schematically in FIG. 8A, the bin assembly may be moved to the closed position with bin 52 retracted within base 12. FIG. 8A shows fore/aft gear assembly 400 secured to the top of bin 52 and featuring forward and rear gears 48 and 46 respectfully engaged to gear racks 148 and 146 on base 12. FIG. 8A shows cross-car gear assembly 200 secured to the base 12 which may comprise right and left cross-car gears 26 and 28 rotatably mounted on opposing ends of the cross-car axle 22 and corresponding right and left rotatable damper gears 16 and 18 which may engage right and left cross-car gears 26 and 28. Damper gears 16 and 18 may be configured to control the movement of bin 52 when the storage bin assembly is opened and closed by providing resistance to movement along gear racks 526 and 528 to achieve the effect of a damper.

Figure 8B:
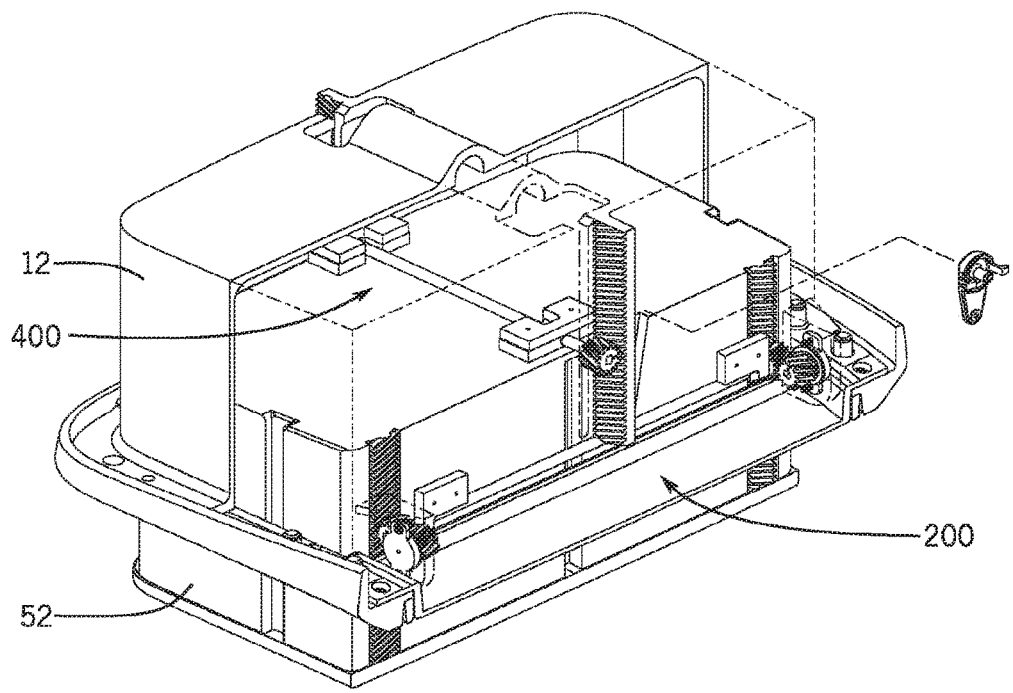

According to an exemplary embodiment as shown schematically in FIG. 8A, with the bin assembly closed, forward and rear gears 48 and 46 may be near the top of gear racks 148 and 146 and cross-car gears 26 and 28 may be engaged to bottom portions of gear racks 526 and 528. As shown schematically in FIG. 8B, bin 52 is in an intermediate position partially extending from base 12. As shown schematically in FIG. 8C, bin 52 is in an extended position relative base 12. According to an exemplary embodiment shown schematically in FIGS. 8B and 8C, the fore/aft gear assembly 400 and cross-car gear assembly may facilitate smooth linear movement of bin 52 relative base 12 with minimal vibration.

According to an exemplary embodiment as shown schematically in FIG. 8D, fore/aft axle 42 may be secured to the top panel of bin 52 by clamp plate 44 and may extend though axle slot (see also FIGS. 4 and 5D) of base 12 so that forward gear 48 may engage gear rack 148. As shown schematically in FIG. 8D, bin 52 is in the retracted position within base 12 and forward gear 48 is engaged to gear rack 148 near the top portion of gear rack 148.

According to an exemplary embodiment as shown schematically in FIG. 8E, right cross-car gear 26 may be rotatably secured to the end of cross-car axle 22 and configured to engage gear rack 526. As shown schematically in FIG. 8E, damper gear 16 may be configured for engaging cross-car gear 26.

Figure 9:
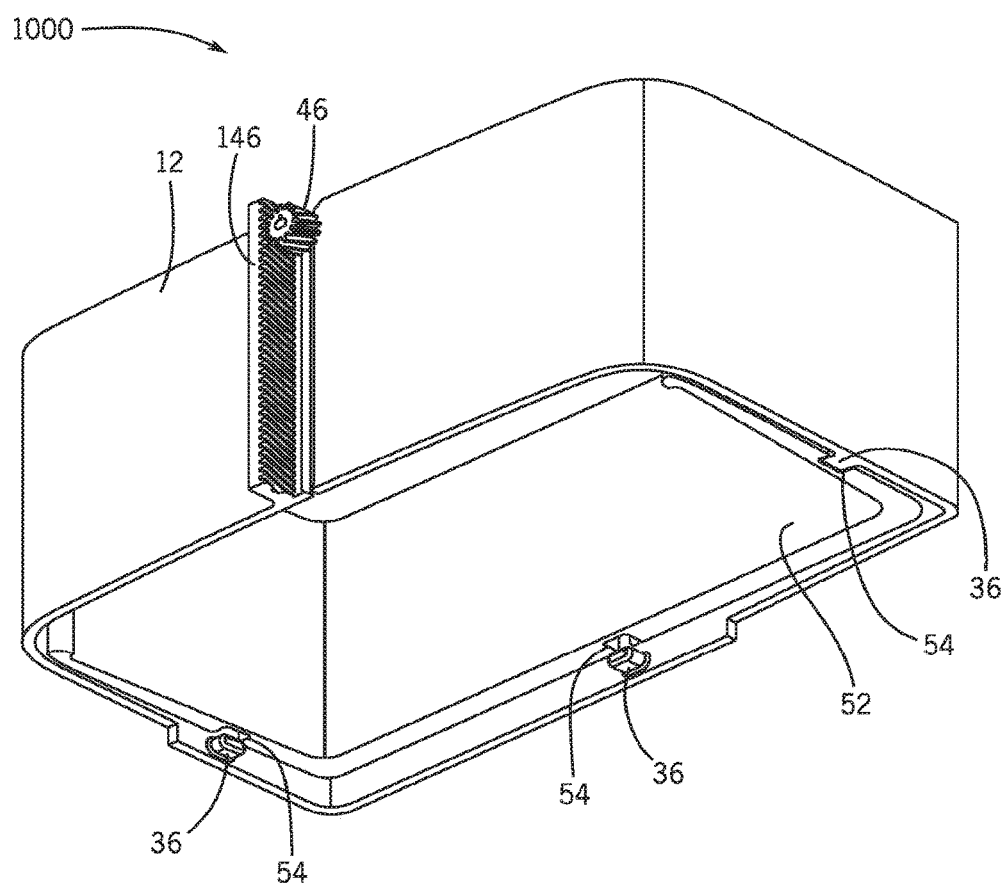
FIG. 9 is a schematic partial perspective view of a storage bin assembly according to an exemplary embodiment.

According to an exemplary embodiment as shown schematically in FIG. 9, tabs 32 may extend generally perpendicular to the slotted channel 54 and may be sized and configured to fit within the channels 53. According to an exemplary embodiment shown schematically in FIG. 9, slotted channels 54 may be configured to slide along the outer edges of tabs 36 on the stationary base 12 when bin 52 slides relative base 12. According to an exemplary embodiment shown schematically in FIG. 9, tabs 36 may facilitate linear alignment and tracking of bin 52 within base 12 to enable smooth linear movement or the bin 52 relative the base 12.

Figure 10:
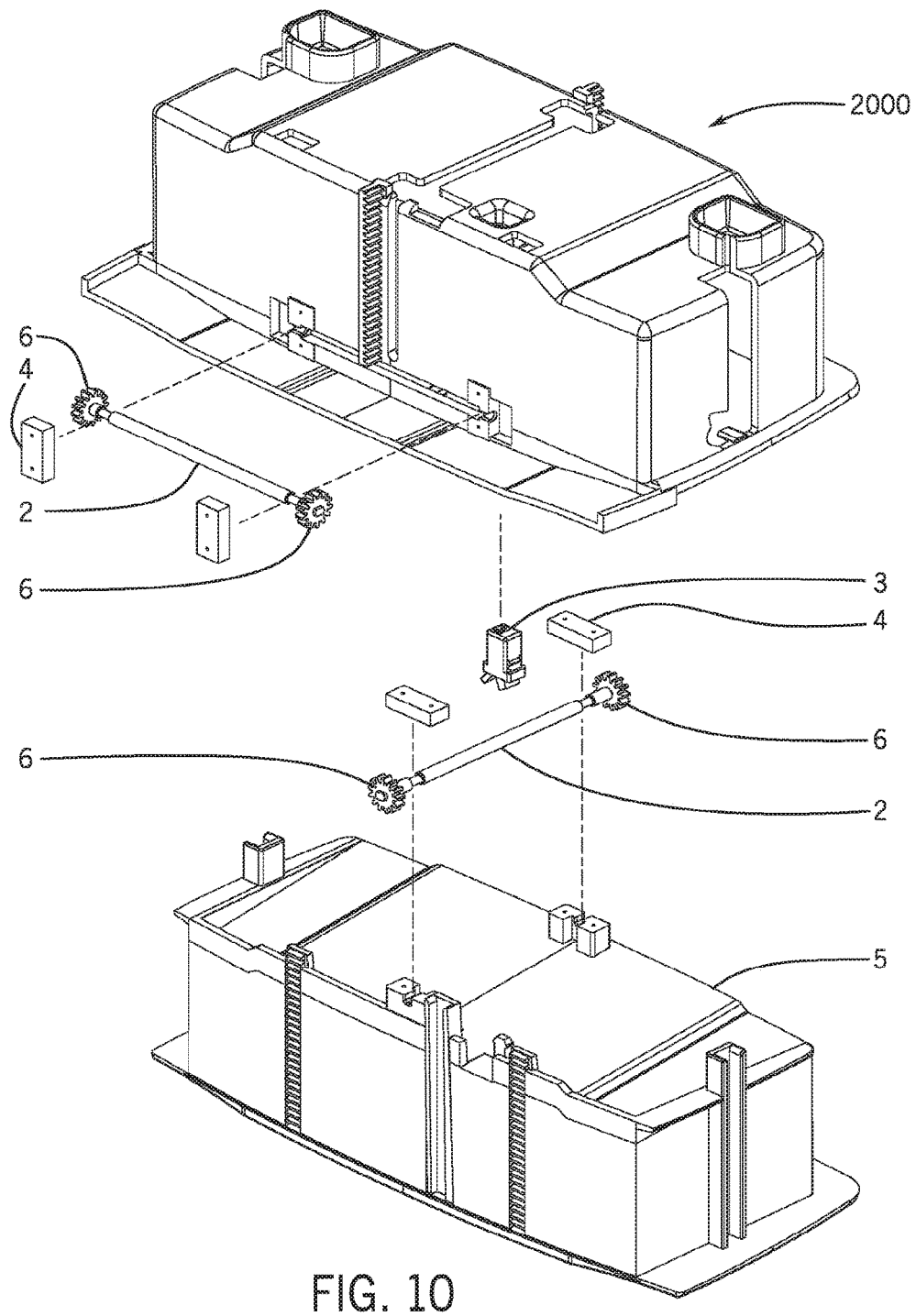
FIG. 10 is a schematic exploded view of a storage bin assembly according to an exemplary embodiment.

According to an exemplary embodiment as shown schematically in FIG. 10, a storage bin assembly 2000 may comprise a housing and bin 5 with a plurality of gear assemblies configured for linear movement of the bin 5 relative the housing. According to an exemplary embodiment as shown schematically in FIG. 10, the housing the may comprise side panels, a closed top panel and an open bottom opposite the top panel. The housing may comprise axle slots and adjacent gear racks on opposing side panels. The axle slots may be vertically oriented and extend through the side panels. The gear racks may extend generally perpendicular to the side panel from which they extend and comprise a plurality of threads or splines for operational engagement with reciprocal teeth of gears 6. As shown schematically in FIG. 10, clamp plates 4 may secure axle 2 to an exterior area on a side panel of the housing in a location below the axle slot and gear rack. According to an embodiment shown schematically in FIG. 10, gears 6 may be rotationally secured to opposing ends of axle 2.

According to an exemplary embodiment as shown schematically in FIG. 10, a gear assembly may be secured to the exterior side of the top panel bin 5. The gear assembly may comprise gears 6 rotationally secured to opposing ends of axle 2. As shown schematically in FIG. 10, axle 2 may be secured to bin 5 by clamp plates 4 secured inward from gears 6. Latch 3 may be secured within the housing and configured for engaging the axle 2 on the top of bin 5.

According to an exemplary embodiment, a vehicle storage bin assembly may comprise a housing having an open bottom and interior chamber and a vertically oriented gear rack outwardly extending from an exterior side of housing; the gear rack may comprise a plurality of spaced-apart teeth; a bin may be configured for linear movement relative the housing; the bin may comprise an open side portion accessing an interior storage compartment; the bin may be configured to be received within the interior chamber of housing; an exterior side panel of the bin may comprise a latch slot having a recessed channel; a latch may be secured to an interior side of the housing; the latch may comprise a dowel configured for slidably engaging the recessed channel of the latch slot. A first gear assembly may be secured to a top panel of the bin; the first gear assembly may comprise an elongated axle and a gear rotatable around the axle; the gear may comprise a plurality of teeth configured to engage the teeth of the gear rack. The bin may be slidable within the interior chamber of the housing between a retracted position where the open side and interior storage compartment of the bin may be concealed by the housing and an extended position where the where the open side and interior storage compartment of the bin are accessible. The vehicle storage bin assembly may comprise an axle slot extending through a side of housing. A portion of axle may extend through the axle slot; the gear rack may be generally perpendicular to the exterior side of the housing; the axle slot and gear rack may be adjacent and generally parallel. The vehicle storage bin assembly may comprise a bezel securable to the housing around at least a portion of the open bottom; the bezel may be securable to the interior ceiling of a vehicle. The vehicle storage bin assembly may comprise a second vertically oriented gear rack on an exterior side of the bin; the second gear rack may comprise a plurality of spaced-apart teeth. The vehicle storage bin assembly may comprise a cross-car axle with a rotatable gear secured to an end; the rotatable gear of the cross-car gear assembly may be configured to engage the cross-car gear rack disposed on the bin.

According to an exemplary embodiment, a vehicle storage bin assembly may comprise a housing having a top panel, an open bottom opposite the top panel and a plurality of side panels downwardly depending from edges of the top panel; the top panel and side panels may define an interior chamber; the interior chamber may be accessible from the open bottom; the housing may comprise a vertically oriented axle slot formed in a first side panel of the plurality of side panels; the axle slot may extend through the side panel. The vehicle storage bin assembly may comprise a vertically oriented gear rack outwardly extending from the first side panel; the gear rack may be adjacent and generally parallel to the axle slot and having a splined surface comprising a plurality of spaced-apart teeth; the gear rack may be oriented generally perpendicular to the first side panel. The vehicle storage bin assembly may comprise a bin configured for linear movement relative to the housing; the bin may comprise opposing top and bottom panels and a plurality of side panels; the bin may comprise an open side leading to an interior storage compartment defined by the top, bottom and side panels; a first side panel of the plurality of side panels of the bin may comprise a vertically oriented cross-car gear rack disposed; the cross-car gear rack may comprise a splined surface featuring a plurality of spaced apart teeth; the bin may comprise a recessed latch slot formed on an outer side of a side panel of the plurality of side panels; the latch slot may comprise a flared top portion, a tapered neck and a bottom portion having a protrusion defining surrounded by an irregularly shaped recessed channel and bottom edge with an upwardly extending ridge; the protrusion may be spaced above the ridge and having a downwardly depending catch. The vehicle storage bin assembly may comprise a first gear assembly may be secured to an exterior side of the top panel of the bin; the first gear assembly may comprise an elongated axle and a rotatable gear at a first end of the axle; the gear may comprise a plurality of teeth; the teeth of gear may be configured to engage the teeth on the gear rack extending from the first side panel of the housing. The vehicle storage bin assembly may comprise a cross-car gear assembly secured to the housing; the cross-car gear assembly may comprise an axle with a rotatable gear secured to an end; the rotatable gear of the cross-car gear assembly may be configured to engage the cross-car gear rack disposed on the bin. The vehicle storage bin assembly may comprise a latch secured to an interior side of a side panel of the housing; the latch may comprise a head portion and arm extending; the arm may comprise a distal end having a dowel extending generally perpendicular; the dowel may be configured for engaging the recessed channel of the latch slot and being seated in the catch on protrusion.

According to an exemplary embodiment as shown schematically in FIG. 11, a conventional storage assembly 3000 may include a bin 3500, a housing 3100 for bin 3500, a spring 3700, a latch 3030, and a backing plate 3600 for housing 3100. According to an exemplary embodiment, a rotary damper 3016 including a gear may be included to control the movement of bin 3500 through internal friction intended to dampen the movement of bin 3500.

RELATED PATENT DOCUMENTS—INCORPORATION BY REFERENCE

The present application incorporates by reference International Application No. WO2016011285A1 titled "Low Profile Storage Assembly for a Vehicle" which shows a vehicle interior component of a type/arrangement as shown schematically in FIG. 11.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that modifications, variations, etc. of the subject matter of the exemplary embodiments and alternative embodiments are possible and contemplated as being within the scope of the present inventions; all such subject matter (modifications, variations, embodiments, combinations, etc.) is intended to be included within the scope of the present inventions. It should also be noted that various/other modifications, variations, substitutions, changes, omissions, etc. may be made in the configuration and/or arrangement of the exemplary embodiments (e.g. in concept, design, structure, apparatus, form, assembly, construction, means, function, system, method, steps, sequence, operation, operating conditions, performance, materials, composition, combination, etc.) without departing from the scope of the present inventions; all such subject matter (modifications, variations, embodiments, combinations, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented in exemplary embodiments, modifications, variations, combinations, etc.) or may comprise any other applicable technology (present or future) with suitability and/or capability to perform the functions and processes/operations described in the specification and/or illustrated in the FIGURES. All such technology is considered to be within the scope of the present inventions of the present patent document.

The invention claimed is:

1. A component for a vehicle interior configured to stow an article comprising:
   (a) a base;
   (b) a bin coupled to the base comprising a receptacle into which the article can be stowed and configured to move relative to the base in a direction to open from a retracted position to an extended position for access to the bin; and
   (c) a mechanism configured to guide movement of the bin relative to the base;
   wherein the mechanism is configured to guide movement of the bin relative to the base along a direction generally parallel to the direction to open;
   wherein the mechanism comprises a set of gears coupled to an axle; a set of gears coupled to the base; and a set of gear racks;
   wherein the set of gears coupled to the base comprises a set of dampers configured to engage the set of gears coupled to the axle and the set of gear racks.

2. The component of claim 1 wherein the set of gears coupled to the axle comprises helical gears and the set of gears coupled to the base comprises helical gears.

3. The component of claim 1 wherein the bin and the set of gear racks are formed as one piece.

4. The component of claim 1 wherein the set of gear racks is configured to engage a set of helical gears.

5. The component of claim 1 wherein the set of gears coupled to the base is configured to provide resistance to movement of the set of gears coupled to the axle to guide movement of the bin relative to the base.

6. The component of claim 1 wherein movement in the direction to open is substantially linear.

7. The component of claim 1 further comprising a latch; wherein the latch is configured to retain the bin when the bin is in the retracted position.

8. A component for a vehicle interior configured to stow an article comprising:
   (a) a base;
   (b) a bin coupled to the base comprising a receptacle into which the article can be stowed and configured to move relative to the base in a direction to open from a retracted position to an extended position for access to the bin; and
   (c) a mechanism configured to guide movement of the bin relative to the base;
   wherein the mechanism is configured to guide movement of the bin relative to the base along the direction to open;
   wherein the mechanism comprises a cross-car gear assembly including a set of cross-car gear racks coupled to the bin and fore-to-aft gear assembly including a set of fore-to-aft gear racks coupled to the base.

9. The component of claim 8 wherein the mechanism comprises a set of axles.

10. The component of claim 9 wherein an axle of the set of axles is coupled to the bin and an axle of the set of axles is coupled to the base.

11. The component of claim 10 wherein the base comprises a slot; wherein at least a portion of an axle of the set of axles extends through the slot of the base.

12. The component of claim 9 wherein the cross-car gear assembly comprises a set of helical gears and the set of cross-car gear racks comprises a set of helical gear racks.

13. The component of claim 9 wherein the base and the set of fore-to-aft gear racks are formed as one piece.

14. The component of claim 8 wherein the mechanism comprises at least one tab configured to move within a slot.

15. The component of claim 8 wherein the bin comprises at least one tab configured to align the bin with the base.

16. The component of claim 8 wherein the base comprises a latch and the bin comprises a slot; wherein the latch is configured to engage the slot of the bin.

17. A component for a vehicle interior configured to stow an article comprising:
   (a) a base;
   (b) a bin coupled to the base comprising a receptacle into which the article can be stowed and configured to move relative to the base in a direction to open from a retracted position to an extended position for access to the bin; and
   (c) a mechanism configured to guide movement of the bin relative to the base;
   wherein the mechanism comprises a set of gears coupled to the base; a set of gear racks coupled to the bin; a set of gears coupled to the bin; and a set of gear racks coupled to the base.

18. The component of claim 17 further comprising a first axle for the set of gears coupled to the base and a second axle for the set of gears coupled to the bin;
   wherein the second axle is generally orthogonal to the first axle.

19. The component of claim 17 wherein the set of gear racks coupled to the bin comprises a set of helical gear racks formed integrally with the bin; and wherein the set of gear racks coupled to the base comprises a set of helical gear racks formed integrally with the base.

\* \* \* \* \*